Patented May 26, 1942

2,283,913

UNITED STATES PATENT OFFICE 2,283,913

COMPOUNDS OF THE CYCLOPENTANOPOLY-HYDROPHENANTHRENE SERIES AND A METHOD FOR PRODUCING THEM

Adolf Butenandt, Danzig-Langfuhr, Free State of Danzig, assignor to Schering Corporation, Bloomfield, N. J., a corporation of New Jersey No Drawing. Application November 26, 1934, Serial No. 754,854. In Germany November 25, 1933

22 Claims. (Cl. 260—397.4)

(Granted under the provisions of sec. 14, act of March 2, 1927; 357 O. G. 5)

This invention relates to the isolation of the male sex hormone from its sources, and more particularly to the conversion of by-products or accompanying substances obtained in the course of the known processes of producing the male sex hormone, and containing the same carbon skeleton as the hormone, into the latter or its derivatives and therapeutically valuable unsaturated hydroaromatic ketones of a higher order, i. e., ketoclyopentanodimethylpolyhydrophenanthroles.

It is already known to separate the male sex hormone of the formula $C_{19}H_{30}O_2$ in crystalline form from extracts of the urine of male individuals. But the yields obtained thereby are very small. Besides, larger amounts of other compounds are found which, hitherto, have not been isolated or made use of. These accompanying compounds have the same carbon skeleton as androsterone but are of unsaturated nature and may contain substituents in the same or in sterically different manner from androsterone, among such compounds being trans-dehydro-androsterone.

We have found that the male sex hormone or its derivatives can be synthesized from these hitherto useless compounds. For instance, when starting with a petroleum ether extract as it remains according to the example of the copending application Serial No. 638,390, filed October 18, 1932, which has matured into Patent No. 2,015,099, after separating the male sex hormone by treating with 60% alcohol, and treating said extract with higher concentrated alcohol, for instance with 80% alcohol, or with other water-miscible solvents of suitable concentration, for instance with methanol and the like (the optimum amount of water can in each case be determined by simple experiment), a further portion having also ketonic functions, passes into said solvent. When adding reagents for the keto group to this solution, such as semicarbazide, hydroxylamine, phenyl hydrazine and the like, a semicarbazone, oxime, phenyl hydrazone or the like crystallizes which, on splitting with dilute sulfuric acid in alcoholic solution, yields on further working up a white crystalline compound of the melting point 156.5–157.5° C. It can be purified by recrystallization from methanol. Its analyses correspond to the formula $C_{19}H_{27}OCl$. Besides one keto group, it contains one atom of chlorine; furthermore, the presence of a double bond in its molecule can be proved; for, on testing according to Liebermann-Burkard ("Handbuch der Physiologisch-Pathologisch-Chemischen Analyse," by Hoppe, Seyler-Thierfelder, 9th ed. p. 327, Berlin 1924), this compound gives a roseate coloration.

Also other starting materials than the urine of male individuals can be used for isolating this and similar chloro ketones when said starting materials were previously subjected to the action of hydrochloric acid. In the place of hydrochloric acid, also other hydrohalic acids or agents capable of yielding hydrogen halide, can be used. One may also proceed in such a manner that the crude extracts obtained according to Funk (Proceedings of the Society for Experimental Biology and Medicine, 26, page 569 (1929)) or crude products obtained synthetically, for instance, by the oxidation of sterines, are directly worked up to such unsaturated chloroketones. It is also possible to subject the entire residue directly without preliminary treatment with solvents to the treatment with reagents for keto groups and to work up the reaction products obtained in the described manner.

The double bond in such unsaturated ketones can be readily hydrogenated by activated hydrogen, for instance by the action of hydrogen in the presence of catalysts, such as palladium and the like, the keto group remaining practically unattacked by this treatment. The hydrogenation can also be carried out at an elevated temperature. The reaction may also take place under pressure. Besides palladium, also other customary hydrogenation catalysts or their mixtures can be used as catalysts. Furthermore in the place of catalytically activated hydrogen, hydrogen which has been activated in another manner, for instance hydrogen in statu nascendi, can be employed.

The hydrogenation of the mentioned chloroketone of the melting point 156.5–157.5° C. is carried out, for instance, in such a manner that the chloroketone is dissolved in alcohol and after the addition of colloidal palladium is shaken with hydrogen. The reaction proceeds more rapidly at an elevated temperature. When the absorption of hydrogen has come to an end, the solution is filtered off from the catalyst and is concentrated. Thereby a saturated chloroketone of the formula $C_{19}H_{29}OCl$ with a melting point of 173° C. crystallizes which does not give any of the color reactions of the unsaturated ketone.

The conversion of said saturated chloroketone into the male sex hormone requires the substitution of the chlorine atom by a hydroxy group. This may, for instance, be achieved in such a manner that first the ester derivative is produced by reacting the chloroketone, according to the principle of the double conversion, with salts of carboxylic or sulfonic acids which ester derivatives are then saponified, if required. However, one may also employ other methods for the conversion of the chlorine atom into the OH-group, as for instance, by directly exchanging them or by introducing intermediate substituents such as the amino group.

In order to carry out this conversion reaction the saturated chloroketone of the melting point of 173° C. is, for instance, heated in alcoholic or acetic acid solution with potassium acetate in a bomb tube for 6 to 8 hours to 180–200° C. After cooling, the reaction mass is washed out of the bomb tube by means of water and the aqueous solution is extracted with ether. From the ether there is obtained, after evaporating the solvent, a mixture of compounds from which the hormone acetate of the melting point 160° C. can be isolated in white needles by fractional crystallization from methanol. By saponifying the acetate, the known male sex hormone in pure crystalline form is produced.

Instead of potassium acetate, also other acetates, for instance silver acetate, or, in general, the salts of carboxylic and sulfonic acids can be used. The isolation of the hormone esters obtained can also be carried out by fractionated sublimation in a high vacuum.

Under the conditions of the production of the above mentioned hormone esters from the halogen ketone there are formed, due to the splitting off of hydrogen halide, unsaturated ketones as by-products. These are separated from the hormone esters by fractional crystallization or sublimation in a high vacuum. It was possible to produce from this mixture of unsaturated hydroaromatic ketones a product of the melting point 103° C. in rectangular lamellas (from methanol). The double bond in this product can be demonstrated by titration with per benzoic acid as well as by the addition of bromine. The dibromide of this compound can be obtained in crystalline form from alcohol.

Of course, one may also proceed in such a manner that the unsaturated halogen ketone is first transformed into the ester and then hydrogenated and, if required, saponified, or that the esterified unsaturated ketone is first saponified and then hydrogenated.

The process described enables one to produce the saturated as well as the unsaturated male sex hormone or its derivatives in a convenient manner from hitherto useless accompanying substances by-products from the isolation of the same.

The following examples serve to illustrate the invention without, however, limiting the same to them:

*Example 1*

30 grams of a "petroleum ether portion" obtained on working up extracts produced from about 4,000 liters of the urine of male individuals, to androsterone, as described, for example, in the above mentioned patent, said portion being practically without any physiological activity, are digested with 4 cc. of benzene on the water bath, mixed with 300 cc. of petroleum ether and filtered after some time. The precipitation is repeated with the precipitate in the same manner, the combined petroleum ether solutions are concentrated in a vacuum to 250 cc. and, subsequently, are extracted ten times with about 100 cc. of 85% alcohol (denatured with methanol). The combined alcoholic portions, after evaporation and drying, leave about 10 g. of a residue which still contains some alcohol which is heated with a solution of 5 g. of semicarbazide acetate in 70 cc. of absolute alcohol for about 12 hours on a water bath so gently that the reaction mass is inspissated during this time to a syrupy consistency. After cooling, it is triturated with a little cooled alcohol, is filtered off by suction and the crystal paste collected on the filter, and is alternately washed with cooled alcohol, ether and hot water. The crude semicarbazone obtained thereby represents a yellowish crystalline powder. The decomposition point lies at about 240° C.

The crude semicarbazone can be recrystallized by extraction with propanol in a Soxhlet apparatus and is obtained in white laminas of the melting point 275° C. For the purpose of further working up the crude semicarbazone, 1 g. of the same is dissolved, while stirring, in 35 cc. of dilute alcoholic sulfuric acid (10 cc. of concentrated sulfuric acid, 15 cc. of water, 75 cc. of alcohol) or in 35 cc. of an alcoholic-aqueous hydrochloric acid (50 cc. of concentrated hydrochloric acid, 50 cc. of alcohol) and is heated for 15 to 20 minutes on the boiling water bath. After diluting with water, it is extracted with ether, the ethereal solution is washed with bicarbonate and water, is dried and evaporated to dryness. The crude cleavage product (about 0.63 g.) is triturated with very little freshly distilled ethanol and is caused to crystallize by cooling. The chloroketone which precipitates is recrystallized from freshly distilled methanol until it shows the constant melting point of 156.5–157.5° C. (not corrected); it is readily soluble in ether, acetone, chloroform, dioxane, acetic acid ester, soluble in petroleum ether, difficultly soluble in cold, readily in hot alcohol. The chloroketone forms elongated prisms which sublimate from 110° C. on at a pressure of $10^{-4}$ mm.; it yields a yellow coloration with tetranitro methane, decolorizes a bromine-glacial acetic acid solution, exhibits a positive Beilstein test and in acetic acid anhydride with concentrated sulfuric acid a yellow coloration which rapidly changes to intensively pink.

The oxime has a melting point of 168–169° C.

The chloroketone can be readily hydrogenated in alcoholic or in glacial acetic acid solution when using a palladium catalyst (palladium black, palladium-barium sulfate or palladium-calcium carbonate catalyst). After one double bond is saturated, also the carbonylic group is attacked and is surprisingly readily reduced to the CHOH— or the CH2— group; for this reason it proves to be expedient to precipitate the saturated chloroketone in the form of the semicarbazone (melting point 285° C.), from the mother liquors of which those portions of the hydrogenation products which are richer in hydrogen, can be obtained by sublimation in a high vacuum.

By decomposing the semicarbazone by means of dilute acids, the dihydro chloroketone $C_{19}H_{29}OCl$ is obtained which crystallizes from dilute alcohol in prismatic needles of the melting point 173° C. (not corrected), and which yields with tetranitro methane no color reaction at all and with acetic acid anhydride and concentrated sulfuric acid only a slightly yellow coloration. Yield up to 95%.

The reaction of the dihydro chloroketone of melting point 173° C. with potassium acetate was carried out by heating the halogen compound with a mixture of potassium acetate and glacial acetic acid for 5 hours in a bomb tube to about 160° C. The reagent was prepared in the following manner: Purest potassium acetate was dissolved in hot glacial acetic acid; the solution was filtered after cooling to room temperature and allowing to stand for several days. It contains in 1 cc. 0.24006 g. of potassium acetate corresponding to 21.1 per cent by weight.

5 cc. weigh 5.7033 g. (the density is 1.1407); after dilution with water to 200 cc., 20 cc. require, in order to be neutralized against phenolphthaleine, 37.50 cc. of n/5 KOH.

The halogen-free reaction product can be extracted from the reaction mass after the addition of water by means of ether; the ethereal solution is washed with bicarbonate and water and is dried with sodium sulfate. After the evaporation of the solvent, there remains a crude crystalline product which shows an unsharp melting point of 125–160° C. It represents a mixture of compounds which can be readily separated, by fractional sublimation in a high vacuum into an unsaturated ketone (35 to 80%) and androsterone acetate (20 to 65%).

The androsterone acetate, after sublimating off the ketone, is deposited from 90° C. on at a pressure of $10^{-4}$ mm. in the neck of the retort in well developed druses of crystals and can be obtained from dilute alcohol in the form of long needles of the melting point 160–161° C. It corresponds in all its properties with the androsterone acetate prepared from natural androsterone, does not show any melting point depression on mixing it with the latter and exhibits the same optical rotation and the same physiological activity. Yield 75%.

The acetate was heated for 2 hours with an excess of 3 n-methylalcoholic potassium hydroxide solution; the reaction solution was diluted and extracted with ether. After evaporating the ether, the residue was carefully distilled at 110° C. ($10^{-2}$ mm.) and was subsequently recrystallized from dilute alcohol. Melting point 178° C. (not corrected). There were not found any differences on comparison with natural androsterone.

*Example 2*

As described in Example 1, first the unsaturated chloroketone is produced. 20 mg. of the same are placed with 100 mg. of potassium benzoate and 300 mg. of benzoic acid as solvent into a micro bomb tube of 4 cm. length which then is closed by fusing, the mixture is heated in a glycerol bath for 20 minutes to about 200° C. and thereupon 100 minutes to about 150° C. (or altogether 90 minutes to 180° C.). An entirely clear, brown-red solution is obtained which solidifies on cooling. The content of the bomb tube is dissolved in boiling alcohol, water is added, and the aqueous solution is extracted with ether. The chlorine compound remains in the aqueous solution while from the ethereal solution the benzoate of the dehydro androsterone is isolated which is almost insoluble in cold alcohol and which crystallizes from alcohol in prisms of the constant melting point 250° C. (not corrected).

The yield of the benzoic acid ester amounts on the average to only 65%; the remaining portions are present in the form of unsaturated compounds.

The reaction of the chloroketone with potassium benzoate makes it possible to precipitate the chloroketone of melting point 157° C. directly from the semicarbazone-crude decomposition products or from the mother liquors in the form of the dehydro androsterone benzoate.

The benzoate of the dehydro androsterone of the melting point 250° C. can be saponified by heating for 2 hours with 2 N-methylalcoholic potassium hydroxide solution. On pouring the reaction mass into water and cooling with ice, the dehydro androsterone precipitates directly in crystalline form; from dilute acetone it is obtained in long white needles of the constant melting point 148° C. (not corrected).

Dehydro androsterone proved to be effective in the capon comb test; its unit is about 600 γ. It can be converted by hydrogenation into a saturated hydroxy ketone of the formula $C_{19}H_{30}O_2$ having a melting point of 172° C., such compound being isomeric with the androsterone of Example 1.

Of course, the given examples serve merely to illustrate the invention; various other modifications and changes in the processes and reagents may be made by those skilled in the art in accordance with the principles set forth herein and in the claims annexed hereto.

What we claim is:

1. A method for the conversion of ketonic by-products obtained on producing the male sex hormone of the formula $C_{19}H_{30}O_2$, into the male sex hormone, said by-products having the carbon skeleton of the male sex homone but having a double bond in the molecule and corresponding to the general formula $C_{19}H_{28}O_2$, said method comprising subjecting said by-products to the action of a halogenizing agent, hydrogenating the double bond of the halogen compound obtained thereby under conditions which will not effect reduction of the keto group, reacting the hydrogenated halogen compound with an agent capable of replacing the halogen with an acyloxy group, saponifying the ester compound to the male sex hormone so obtained, and isolating the latter.

2. A method for the conversion of ketonic by-products obtained on producing the male sex hormone of the formula $C_{19}H_{30}O_2$, into the ester derivatives of the male sex hormone, said by-products having the carbon skeleton of the male sex hormone but having a double bond in the molecule and corresponding to the general formula $C_{19}H_{28}O_2$, said method comprising subjecting said by-products to the action of a halogenizing agent, hydrogenating the double bond of the halogen compound obtained thereby under conditions which will not effect reduction of the keto group, reacting the hydrogenated halogen compound with an agent capable of replacing the halogen with an acyloxy group, and isolating the so obtained ester of the male sex hormone.

3. A method of producing the acid derivatives of the male sex hormone of the general formula $C_{19}H_{30}O_2$, which comprises subjecting an unsaturated compound of the general formula $C_{19}H_{27}O_2X$, wherein X represents an acid group, to the action of activated hydrogen to effect saturation of the nuclear double bond, interrupting the hydrogenation procedure when 2 hydrogen atoms are absorbed, and isolating the saturated compound of the general formula $C_{19}H_{29}O_2X$.

4. A method for the conversion of ketonic by-products obtained on producing the male sex hormone into the male sex hormone and unsaturated keto-cyclopentano-dimethyl-polyhydrophenanthroles, said by-products having the carbon skeleton of the male sex hormone but having a double bond in the molecule and corresponding to the general formula $C_{19}H_{28}O_2$, said method comprising subjecting said by-products to the action of a halogenizing agent to transform them into the corresponding halogen compounds, hydrogenating the double bond of the latter under conditions which will not effect reduction of the keto group, reacting the hydrogenated product with an agent capable of replacing halogen with an acyloxy group, and saponifying the ester compounds, said halogenizing, hydrogenating, esterifying and saponifying reactions being conducted in any desired order except that the halogenation precedes the esterification and the latter precedes the saponification, thereby transforming said by-products into the male sex hormone and unsaturated keto-cyclopentano-dimethyl-polyhydro-phenanthroles, and separating the male sex hormone from the latter.

5. A method for the production of the male sex hormone and keto-cyclopentano-dimethyl-polyhydro-phenanthroles from the ketonic by-products obtained on isolating the sex hormone from mixtures containing the same, said by-products having the carbon skeleton of the male sex hormone but having a double bond in the molecule and corresponding to the general formula $C_{19}H_{28}O_2$, said method being characterized by the feature that the by-products are first transformed into halogen compounds, which latter are converted by hydrogenation of the double bond in the molecule, reaction with an agent capable of replacing the halogen with an acyloxy group, and saponification of the esters into the male sex hormone, the hydrogenating, esterifying and saponifying reactions being conducted in any order except that the esterification precedes the saponification, the hydrogenation being conducted under such conditions that the keto group is not reduced, whereupon the hormone is separated from the unsaturated keto-cyclopentano-dimethyl-polyhydro-phenanthroles which are also formed.

6. In a method for the conversion of ketonic by-products obtained on producing the male sex hormone into a compound of the group consisting of the male sex hormone and other keto-cyclopentano-polyhydro-phenanthrene compounds having a physiological action similar to that of the male sex hormone, said by-products having the carbon skeleton of the male sex hormone but having a double bond in the molecule and corresponding to the general formula $C_{19}H_{28}O_2$, the steps which comprise subjecting said by-products to hydrogenation and esterification agents in any order, the hydrogenation agent being such as will saturate the double bond in the molecule without reducing the keto group, and the esterification agent being capable of introducing an acyloxy group into the 3-position.

7. In a method for the conversion of ketonic by-products obtained on producing the male sex hormone into a compound of the group consisting of the male sex hormone and other keto-cyclopentano-polyhydro-phenanthrene compounds having a physiological action similar to that of the male sex hormone, said by-products having the carbon skeleton of the male sex hormone but having a double bond in the molecule and corresponding to the general formula $C_{19}H_{28}O_2$, the steps which comprise subjecting said by-products to halogenation, hydrogenation and esterification agents in any order except that esterification follows halogenation, the hydrogenation agent being such as will saturate the double bond in the molecule without reducing the keto group, and the esterification agent being capable of replacing halogen with an acyloxy group.

8. In a method for the isolation of a male sex hormone and an unsaturated halogen ketone having the molecular structure of the male sex hormone from crude mixtures containing the male sex hormone and an unsaturated keto-compound having the carbon skeleton of the male sex hormone, the steps which comprise subjecting the crude starting material containing the hormone to the action of a hydrolyzing and halogenating agent of the group consisting of hydrogen halide and agents capable of yielding hydrogen halide, and then separating the male sex hormone from the halogenated compound by distributing them between solvent mixtures in which they have different solubilities.

9. In a method of isolating the male sex hormone and an unsaturated halogen ketone having the molecular structure of the male sex hormone from crude mixtures containing the male sex hormone and an unsaturated keto-compound having the carbon skeleton of the male sex hormone, the steps of first subjecting the crude starting material containing the hormone to the action of a hydrolyzing and halogenating agent selected from the group consisting of hydrogen halide and a compound capable of yielding hydrogen halide, extracting said halogen ketone and male sex hormone by means of a hydrocarbon solvent, removing from said extract the male sex hormone by treating the same with an aqueous, water-miscible solvent, the water content of which is so high that only the male sex hormone is removed, while the halogen ketone remains in solution, dissolving the halogen ketone from the hydrocarbon extract by extracting the same with an aqueous water-miscible solvent, the water content of which is so low that said unsaturated halogen ketone passes into the water-miscible solvent, and isolating from the latter the halogen ketone.

10. A method for the conversion of ketonic by-products obtained on producing the male sex hormone, into a compound of the group consisting of the male sex hormone and other keto-cyclopentano-polyhydro-penanthrene compounds having a physiological action similar to that of the male sex hormone, said by-products having the structure of the male sex hormone but having a double bond in the molecule and corresponding to the general formula $C_{19}H_{28}O_2$, said method comprising the steps of subjecting said by-products to hydrogenation under conditions which will effect saturation of the double bond in the molecule but will not cause reduction of the keto group, esterification with an agent capable of introducing an acyloxy group into the 3-position, and saponification in any order except that the esterification precedes the saponification.

11. A cyclopentano phenanthrene derivative of the general formula $C_{19}H_{29}ZOR$, wherein R is an acyl group and Z is a group obtained by reacting ketonic oxygen with a keto reagent.

12. A method for the production of the esters of the male sex hormone from ketonic compounds accompanying the hormone in mixtures obtained in the production of the hormone, said compounds having the carbon skeleton of the male sex hormone but having a double bond in the molecule and corresponding to the general formula $C_{19}H_{28}O_2$, said method comprising subjecting said compounds to hydrogenation and esterification in any order, the hydrogenation agent being such as will saturate the double bond in the molecule without reducing the keto group, and the esterification agent being capable of introducing an acyloxy group into the 3-position, and isolating the saturated ester material.

13. A method for the production of the esters of the male sex hormone from halogenated ketonic compounds accompanying the hormone in mixtures obtained in the production of the hormone, said compounds having the general formula $C_{19}H_{27}OCl$ and the carbon skeleton of the male sex hormone, which comprises subjecting said halogenated compounds to hydrogenation and esterification in any order, the hydrogenation agent being such as will saturate the double bond in the molecule without reducing the keto group, and the esterification agent being capable of replacing halogen with an acyloxy group, and isolating the saturated ester material.

14. The method according to claim 2, including the step of reacting the keto-acyloxy compound with a reagent capable of condensing with the keto group.

15. A process for saturating the nuclear double bond of a nuclearly unsaturated keto cyclopentano-10,13-dimethyl polyhydro phenanthrene compound, which comprises the hydrogenation of such double bond with hydrogen gas in the presence of a catalyst of the platinum metal group.

16. A process for saturating the nuclear double bond of a nuclearly unsaturated keto cyclopentano-10,13-dimethyl polyhydro phenanthrene compound, which comprises the hydrogenation of such double bond with hydrogen gas in the presence of palladium.

17. A process for saturating the nuclear double bond of a nuclearly unsaturated 3-substituted 17-keto cyclopentano-10,13-dimethyl polyhydro phenanthrene compound, which comprises the hydrogenation of such double bond with hydrogen gas in the presence of a catalyst of the platinum metal group.

18. In a process for converting dehydro-androsterone into a saturated derivative having the same carbon nucleus, the step which comprises effecting saturation of the nuclear double bond with the aid of hydrogen in the presence of a catalyst of the platinum metal group.

19. In a process for converting dehydro-androsterone into a saturated derivative having the same carbon nucleus, the step which comprises effecting saturation of the nuclear double bond with the aid of hydrogen in the presence of palladium.

20. A process for the production of 3-hydroxy-etioallo-cholanone-(17) from dehydro-androsterone which comprises the hydrogenation of dehydroandrosterone by hydrogen gas in the presence of palladium.

21. The ketones of the formula

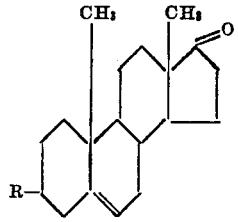

wherein R stands for an esterified hydroxyl group.

22. The benzoate of dehydroandrosterone.

ADOLF BUTENANDT.